(12) United States Patent   (10) Patent No.: US 8,434,978 B2
Tardif et al.   (45) Date of Patent: May 7, 2013

(54) OFFSET HOOK AND FASTENER SYSTEM (75) Inventors: Thomas A. Tardif, Laconia, NH (US);
   Douglas J. Lambert, Gilford, NH (US)

(73) Assignee: Lock N Load Systems LLC, Gilford, NH (US)

( * ) Notice: Subject to any disclaimer, the term of this patent is extended or adjusted under 35 U.S.C. 154(b) by 0 days.

(21) Appl. No.: 13/449,817

(22) Filed: Apr. 18, 2012

(65) Prior Publication Data

US 2012/0198661 A1   Aug. 9, 2012

Related U.S. Application Data (62) Division of application No. 12/557,942, filed on Sep. 11, 2009, now Pat. No. 8,182,182.

(51) Int. Cl.
   *B60P 7/08*   (2006.01)
(52) U.S. Cl.
   USPC ................................ 410/100; 410/32; 410/97
(58) Field of Classification Search .................... 410/10, 410/11, 12, 20, 21, 23, 31, 32, 34, 50, 96, 410/97, 100, 117; 224/403, 568, 534, 318, 224/572; 24/301, 302, 69 ST, 71 ST, 69 CT, 24/68 CD, 68 CT, 265 CD; 248/499
   See application file for complete search history.

(56) References Cited

U.S. PATENT DOCUMENTS 3,128,106 A * 4/1964 Zinkel, Jr. ...................... 410/41
8,182,182 B2 * 5/2012 Tardif et al. .................. 410/100

* cited by examiner

*Primary Examiner* — Stephen Gordon
(74) *Attorney, Agent, or Firm* — Robert R. Deleault, Esq.; Mesmer & Deleault, PLLC

(57) ABSTRACT

An adapter kit for use with conventional tie-down straps or ropes includes an universal hook adapter having an adapter body with an opening formed at a first body end and sized to receive one of a J-hook, a split hook or an S-hook of a conventional tie-down strap or a rope, the adapter body defining a longitudinal axis plane, and an elongated end portion connected to the adapter body opposite the first body end through a bend that positions the elongated end portion to extend from and to continue in a longitudinal direction away from the adapter body and the first body end wherein the elongated end portion is parallel to and offset from the longitudinal axis plane of the adapter body.

4 Claims, 7 Drawing Sheets

OFFSET HOOK AND FASTENER SYSTEM

This application is a Divisional Application of Ser. No. 12/557,942, filed on Sep. 11, 2009.

BACKGROUND OF THE INVENTION

1. Field of the Invention

The present invention relates generally to tie-down devices. Particularly, the present invention relates to tie-down devices and systems for securing cargo. More particularly, the present invention relates to the connector elements of tie-down devices for securing cargo.

2. Description of the Prior Art

Many people choose to move cargo such as construction materials, home furnishings and the like themselves by employing pickup trucks, flatbed trucks, and the like. The mover loads the cargo onto the truck and then secures the cargo so the cargo does not move or fall out of the truck and be damaged. Most of this cargo is secured using lengths of cord or commercially available tie-down and strap systems such as ratchet straps.

A typical, commercially available ratchet and strap system includes a two-arm tensioning device that is used to tighten and to lock load-fastening straps or belts. The arms are pivotally mounted about a reel drum on which are mounted toothed discs which turn with the drum. Upon pivoting of the first arm, the strap or belt is wound onto the reel drum by the engagement of a first catch on the first arm with the teeth of the discs. A second catch on the second arm is provided to prevent, through its engagement with the disc teeth, turning movement of the drum in the opposite direction. The second arm includes a locking member arranged to releasably engage the first catch to prevent unintentional pivoting of the first arm after tightening of the belt. A special safety catch in the form of a projection is provided on the first arm to releasably retain the second catch in engagement with the disc teeth.

U.S. Pat. No. 7,296,326 (2007, Madachy et al.) discloses a cargo tightener and strap collector. The tightener and strap collector includes a rotatable shaft provided on the lever portion of the cargo tightener. A slot is provided in the shaft so that the free end of a strap may be inserted in the slot and wound on the shaft to secure the strap. The strap ends typically employ J-hooks for attaching the straps to the truck.

U.S. Pat. No. 7,377,484 (2008, Williams) discloses a multi-functional ratchet and associated method. The multi-functional ratchet includes first and second bars with left and right axially opposed ends, respectively. Each bar is provided with a channel formed therein with a longitudinal length that is less than the longitudinal length of the bar. The device further includes first and second beams with axially opposed proximal and distal ends. The beams are pivotally attached to the bars. Each beam is provided with a channel formed therein with a longitudinal length that is less than a longitudinal length of the beam. A winding mechanism winds a strap about a central portion of the ratchet when the first and second beams are laterally displaced away from equilibrium. The winding mechanism is connected to the bars and the beams, respectively. The strap ends employ J-hooks for attaching the straps to the truck.

U.S. Pat. No. 7,231,693 (2007, Wilcox et al.) discloses a strap-tensioning device with tension indicator for anchoring a load to an anchor point. The device includes a strap, a base member having a pair of arms, a handle rotatably connected to the base member, a mechanism operated by rotation of the handle for securing the strap to the base member under a tension, an anchor for anchoring the base member to the anchor point, and a tension indicating device connected to the base member. Like the previously disclosed prior art, this patent only discloses the use of J-hooks connected to the ends of the straps for attaching to the anchor points.

U.S. Pat. No. 7,020,933 (2006, Chang) discloses a connector device for suspending straps. The connector device includes a base coupled to a strap and having a chamber formed between two side panels and having a curved slot formed in each side panel. A connector frame is rotatably secured to the base with an axle, a shaft is attached to the frame and slidably engaged in the curved slots of the side panels of the base. A latch is slidably attached to the frame to selectively lock the frame to the base. Hooks, and particularly, J-type hooks are shown connected to the ends of the straps.

Figure 12:
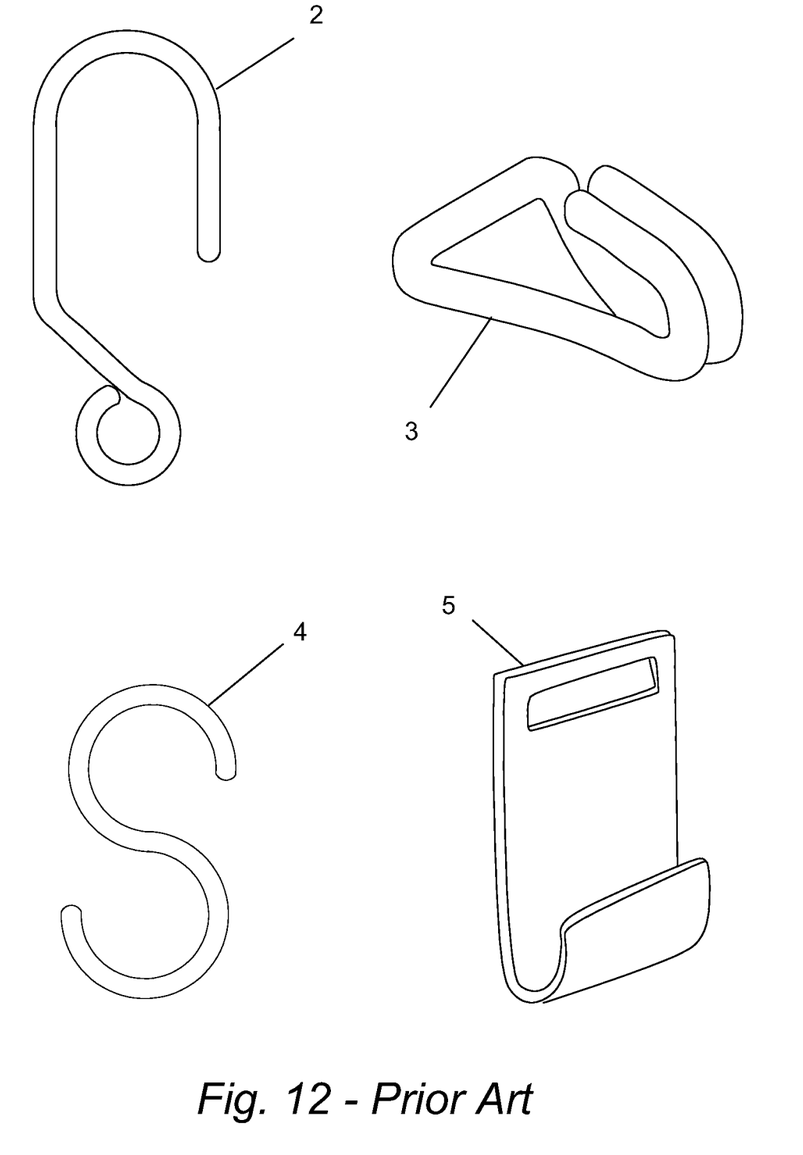
FIG. 12 illustrates a J-hook, a split hook, a S-hook, and a flat hook used in the prior art.

Most truck beds include specific anchor points as well as a plurality of drain holes and the like. Ratchet and strap systems can be frustrating to use with these truck beds especially when relatively low-profile cargo such as flat goods needs to be tied down. The J-hooks are dimensioned so that they cannot always be easily connected to the truck or an anchor point and provide sufficient tie-down pressure to hold the cargo in place during transportation. The end hooks attach to the truck but often place the tie-down strap at a height above the truck bed that prevents the tie-down strap from properly securing the cargo. The drain holes and other potential anchoring points are inaccessible for use with conventional curved or looped hooks such as the J-hook 2, split hook 3, S-hook 4, or flat hook 5 shown in FIG. 12.

Therefore, what is needed is a strap and hook system that is attachable to a truck bed and/or anchor point that can securely fasten any cargo to a truck bed. What is also needed is an anchor point adapter that enables the use of conventional tie-down straps for securing low-profile cargo to a truck bed.

SUMMARY OF THE INVENTION

It is an object of the present invention to provide a hook tie-down component that is attachable to a truck bed and/or anchor point while securely fastening cargo to the truck bed regardless of the cargo profile. It is another object of the present invention to provide an offset hook and fastener system that is capable of securing relatively flat or low-profile cargo to the truck bed.

The present invention achieves these and other objectives by providing a an offset hook for use with any type of tie-down device, a tie-down strap with an offset hook, a tie-down system incorporating an offset hook on the tie-down strap ends, and a kit of offset hooks and adapters for use with any type of tie-down device.

In one embodiment of the present invention, a tie-down strap system includes an adjustable tie down strap component having a first strap secured on one end to a strap adjusting mechanism and an anchor point connector on an opposite end. A second strap has a free end that is removably and operably connected to the strap adjusting mechanism and an opposite end fixedly attached to an anchor point connector. The anchor point connector includes a connector body with an opening formed at a first body end to which a strap end is secured, and an elongated end portion extending longitudinally away from the connector body for a predefined distance and offset from the plane of the connector body.

In another embodiment of the present invention, the connector body of the anchor point connector is a substantially flat, elongated member.

In a further embodiment of the present invention, the anchor point connector is formed from a rod wherein the opening at the first body end of the connector body is a loop formed with a portion of the rod.

In still another embodiment of the present invention there is included an interconnect adapter having an elongated adapter body with a first adapter opening formed in a first adapter body end and a second adapter opening formed in a second adapter body end wherein the first adapter opening and the second adapter opening are sized for interlockingly receiving the elongated end portion of the anchor point connector.

In yet another embodiment of the present invention, there is included an offset adapter hook. The offset adapter hook has a central body portion, a hook that extends from one end of the central body portion forming a hook recess, and an anchor point connector end that extends from an opposite end of the central body portion. The anchor point connector end has a connector receiver body with a connector receiver aperture where the connector receiver body is lateral to the plane of the hook. In one embodiment, the anchor point connector end is offset from the longitudinal axis plane of the central body portion toward the hook recess of the hook in the first hook end. In another embodiment, the anchor point connector end is offset away from the hook recess of the hook.

In another embodiment of the present invention, there is included a flat hook adapter having a substantially flat and planar body with a hook formed at one end and an aperture formed in the second end. The aperture is sized for interlockingly receiving the elongated end portion of the anchor point connector.

In another embodiment of the present invention, a kit is provided that includes a universal hook adapter and instructions. The universal hook adapter has an adapter body with an opening formed at a first body end and sized to receive one of a J-hook, a split hook or an S-hook of a conventional tie-down strap system, and an elongated end portion fixedly attached to a second body end of the adapter body and extending longitudinally away from the connector body for a predefined distance. The elongated end portion is offset from the longitudinal axis plane of the connector body. The instructions instruct the user of the kit to install the elongated end portion of the universal hook adapter into an anchor point of a truck bed that is an opening with a recessed backplane area and to connect the hook of a conventional tie-down strap system to the opening in the adapter body.

In a further embodiment of the kit, the kit additionally includes an offset adapter hook having an adapter hook body with a central body portion, a hook that extends from one end of the central body portion forming a hook recess, and an elongated end portion that longitudinally extends from an opposite end of the central body portion for a predefined distance where the elongated end portion is offset from the longitudinal axis of the central body portion. The elongated end portion is sized for interlockingly connecting with the opening formed in the first body end of the universal hook adapter or with an anchor point in a truck bed that is a drain hole or bolt hole. In one embodiment of the offset hook adapter, the elongated end portion is offset toward the hook recess of the hook. In another embodiment of the offset hook adapter, the elongated end portion is offset away from the hook recess of the hook.

DETAILED DESCRIPTION OF THE PREFERRED EMBODIMENT

Figures 1, 2:
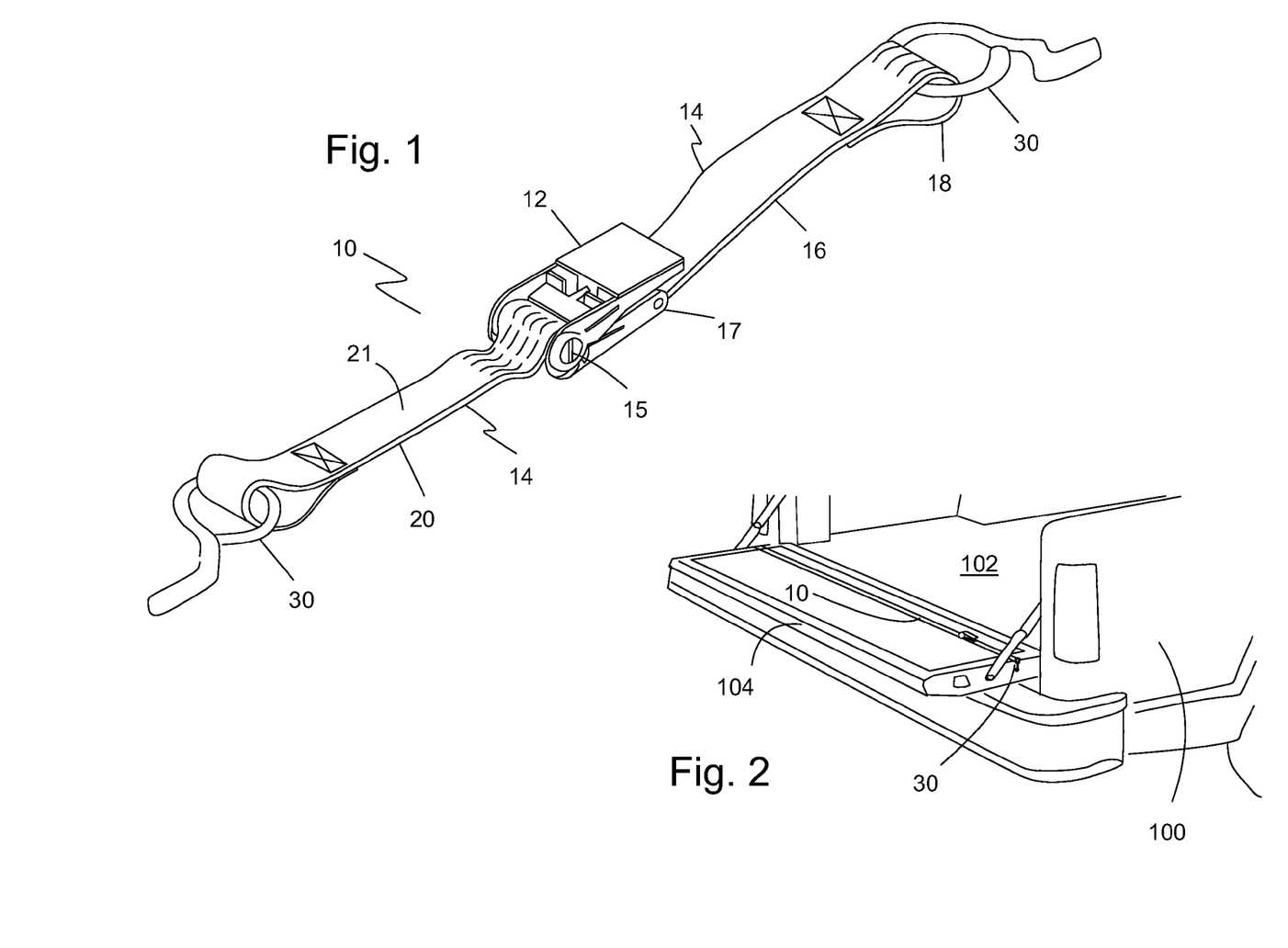
FIG. 1 is a perspective view of one embodiment of the present invention showing a ratchet-type mechanism with anchor point connectors.
FIG. 2 is a perspective view of the embodiment shown in FIG. 1 mounted on a tailgate portion of a truck bed.

The preferred embodiments of the present invention are illustrated in FIGS. 1-11. FIG. 1 shows one embodiment of a tie-down strap system 10 of the present invention. Tie-down strap system 10 includes a ratcheting mechanism 12 and an adjustable tie-down strap component 14. Adjustable tie-down strap component 14 includes a first strap 16 with an anchor point connector 30 and a second tightening strap 20 with an anchor point connector 30. First strap 16 is secured on one end 17 to ratcheting mechanism 12 and with anchor point connector 30 secured on an opposite end 18. Second tightening strap 20 has a second strap body 21 and a free end 22 (not shown) that operationally engages a rotatable spool 13 of ratcheting mechanism 12. Second tightening strap 20 also has a connector end 23 that is fixedly coupled to a second anchor point connector 30. Ratcheting mechanism 12 can be any type of strap tightening ratchet mechanism known in the art. Although a ratcheting mechanism is disclosed and shown, it should be understood that and type of strap or cord tightening structure can be used such as adjustable clips, buckles, clamps, one-way clamps, and the like.

FIG. 2 illustrates one use of the present invention. A pickup truck 100 typically has a cargo bed 102 that oftentimes includes the tailgate 104 as an extension of cargo bed 102.

Cargo bed 102 and tailgate 104 may include drain holes, bolt holes, air holes, and the like. Typically, cargo bed 102 also includes factory installed anchor points. These anchor points, however, are generally located about six (6) inches above the cargo bed. A major problem with these factory installed anchor points is that they are not usable for securing thin, low-profile loads such as a plurality of sheets of plywood or a plurality of boards or framing lumber and other low-profile items. As illustrated in FIG. 2, the tie-down strap system 10 of the present invention uses, as one example, the drain holes in the tailgate 104 as the anchor points for the bent-rod or offset-hook anchor point connector 30. Because anchor point connector 30 is capable of an interlocking arrangement with the drain holes in tailgate 104, relatively thin, low-profile loads can be secured to the cargo bed 102 since adjustable strap component 14 of tie-down strap system 10 is physically within close proximity to the surface of the cargo bed 102. Typically, anchor point connector 30 positions adjustable strap component 14 onto the surface of cargo bed 102.

Figures 3A, 3B, 4A, 4B:
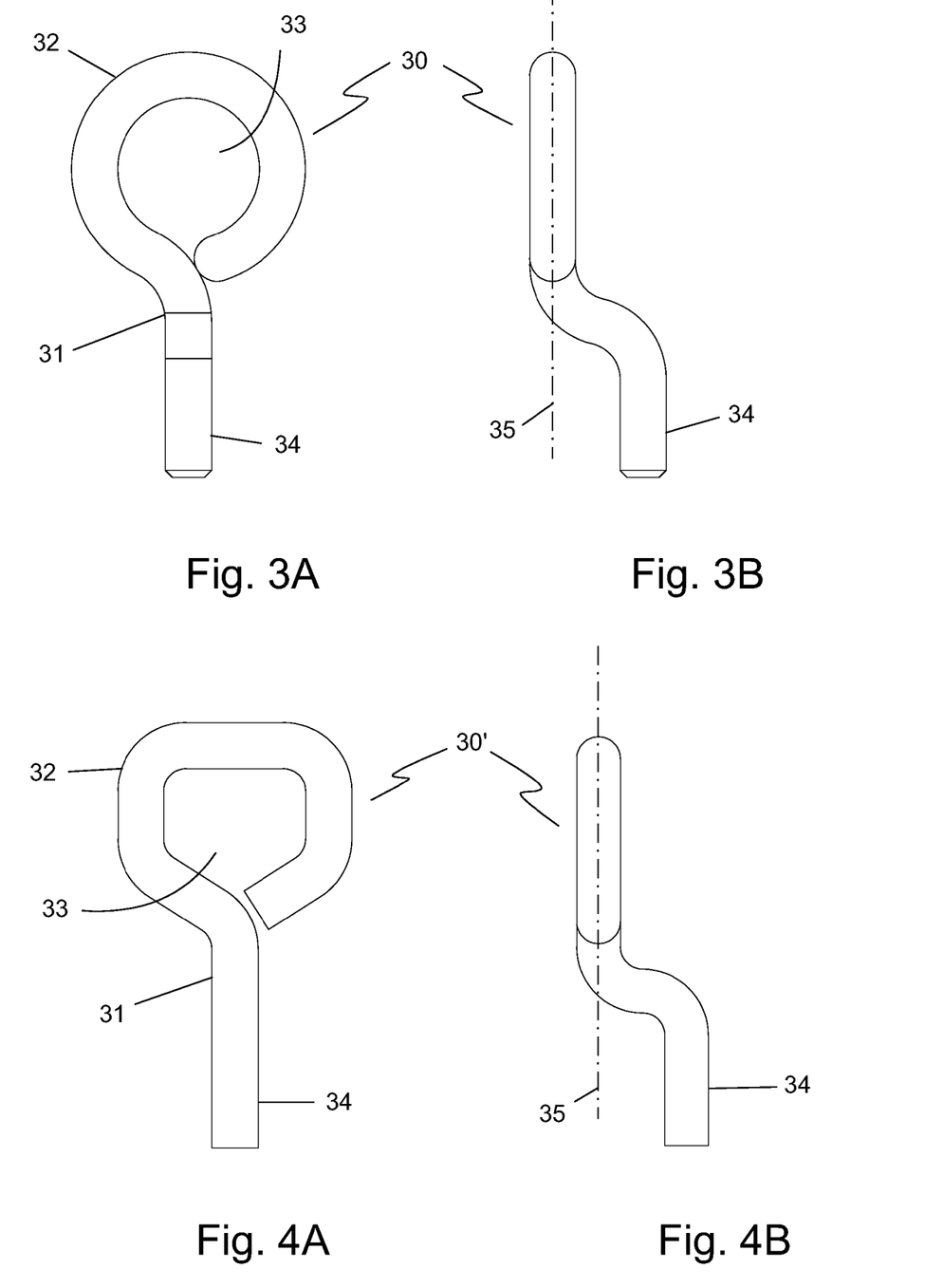
FIG. 3A is a front view of one embodiment of the anchor point connector of the present invention.
FIG. 3B is a side view of the anchor point connector shown in FIG. 3A.
FIG. 4A is a front view of another embodiment of the anchor point connector of the present invention.
FIG. 4B is a side view of the anchor point connector shown in FIG. 4A.

Turning now to FIGS. 3A and 3B, there is illustrated one embodiment of anchor point connector 30. Anchor point connector 30 has a connector body 31 with an opening 33 formed in first body end 32. An elongated end portion 34 extends longitudinally away from connector body 31 for a predefined distance and is offset from the longitudinal axis plane (illustrated as line 35) of first body end 32. Anchor point connector 30 is preferably formed from a rod having a three-eighths' inch diameter (⅜"). Opening 33 in first body end 32 is a circular loop formed with a portion of the rod. The strap or cord is secured to opening 33 and elongated end portion 34 is sized to fit through one of the drain holes and the like and the offset characteristic functions to interlock with the drain hole by positioning the elongated end portion 34 against the back plane of the wall in which the drain hole is formed, which is more clearly shown in FIG. 5.

FIGS. 4A and 4B illustrate another embodiment of the anchor point connector. Anchor point connector 30' includes all of the same structural elements as anchor point connector 30 except for the shape of opening 33. In this embodiment, opening 33 has a rectangular or square shape to better accommodate the strap ends 18, 23 of first strap 16 and second strap 20, respectively, when coupled to opening 33. Like anchor point connector 30, anchor point connector 30' has an elongated end portion 34 that is offset from the longitudinal axis plane 35 of first body end 32. It should be noted that the offset bend is approximately a ninety degree (90°) bend but could be less as shown in FIG. 3B, which illustrates an approximately forty-five degree (45°) bend. The offset bend should be sufficient so that anchor point connector 30 is structurally maintained within a drain hole and the like by the tension applied to anchor point connector 30 by a flexible fastening strap or cord.

Figure 5:
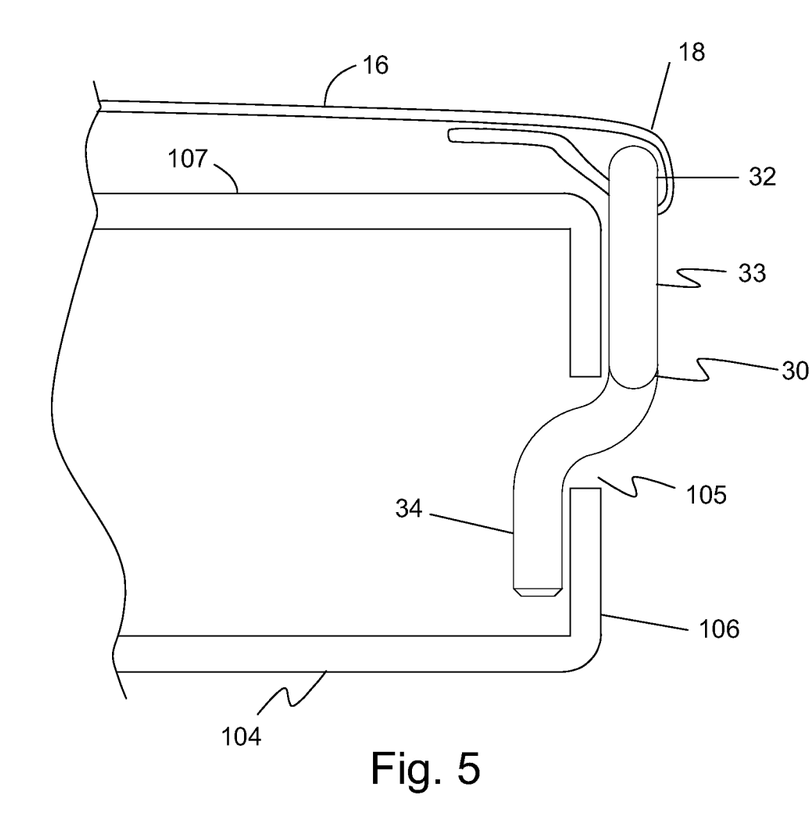
FIG. 5 is a cross-sectional view of one embodiment of the anchor point connector positioned in a drain hole of a tailgate.

Turning now to FIG. 5, there is illustrated an enlarged, cross-sectional view of a tailgate with an anchor point connector coupled to a drain hole in the tailgate. It should be noted that the size of the opening in the sidewall of the tailgate is exaggerated for clarity. As can be seen in FIG. 5, elongated end portion 34 of anchor point connector 30 is inserted into drain opening 105 in side wall 106 of tailgate 104. First strap 16 is coupled at first strap end 18 to opening 33 formed in first body end 32. When the tie-down strap or rope is tightened, the load pull direction of first strap 16 forces first body end 32 toward side wall 106 while simultaneously causing elongated end portion 34 against the inside of side wall 106. Anchor point connector 30 advantageously uses drain opening 105 to position first strap 16 against or relatively close to the load supporting side 107 and allowing the proper securing of low profile cargo using tie-down strap system 10.

Figure 6A:
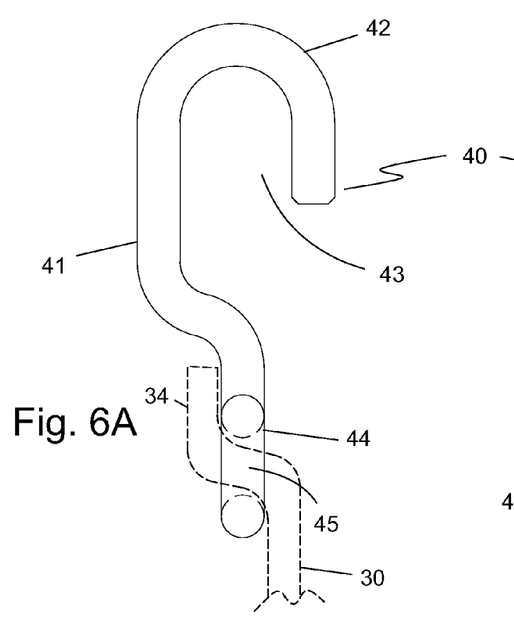
FIG. 6A is a front view of a J-hook adapter of the present invention for use with an anchor point connector of the present invention.
Figure 6B:
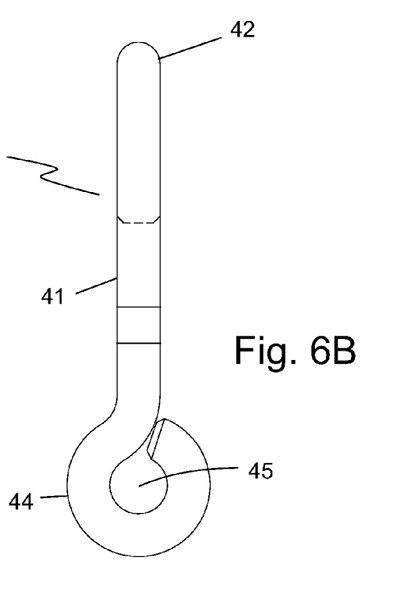
FIG. 6B is a side view of the J-hook adapter shown in FIG. 6A.

FIGS. 6A and 6B illustrate one embodiment of a tie-down adapter 40 of the present invention. Tie-down adapter 40 includes an adapter body 41, an adapter first end 42, and an adapter second end 44. Adapter first end 42 includes a hook that extends from one end of adapter body 41 forming a hooking recess 43. In this embodiment, hooking recess 43 is similar to conventional J-hooks. Hooking recess 43 is adapted for coupling to a standard anchor point capable of holding a conventional J-hook or to other conventional J-hooks used on conventional tie-down straps or ropes. Adapter second end 44 includes an anchor connector opening 45. Anchor connector opening 45 is sized to receive elongated end portion 32 of anchor point connector 30 for interlocking with anchor point connector 30 and to prevent anchor point connector 30 from easily falling out of its interlocking relationship with tie-down adapter 40. A portion of an anchor point connector 30 is shown in dashed lines to illustrate one way of coupling the two components. The size of anchor connector opening 45 allows anchor point connector 30 and tie-down adapter 40 to remain coupled while tensioning the tie-down straps or ropes.

Figure 7A:
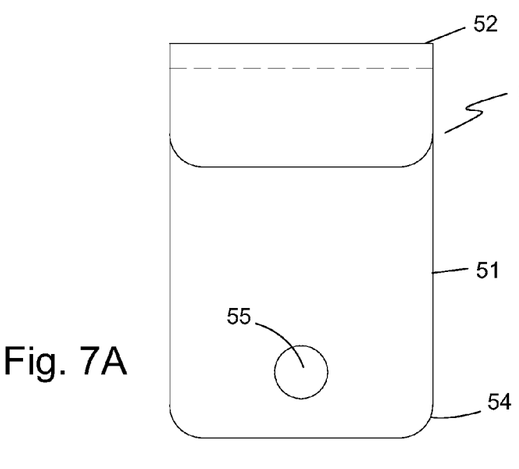
FIG. 7A is a front view of a flat-hook adapter of the present invention for use with an anchor point connector of the present invention.
Figure 7B:
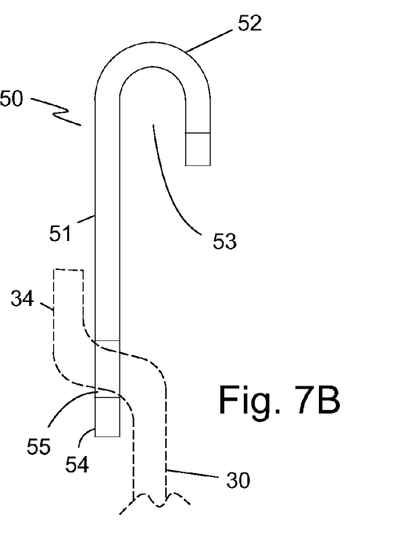
FIG. 7B is a side view of the flat-hook adapter shown in FIG. 7A.

FIGS. 7A and 7B illustrate another embodiment of a tie-down adapter of the present invention. Tie-down adapter 50 includes an adapter body 51, an adapter first end 52, and an adapter second end 54. Adapter first end 52 includes an elongated hooking recess 53. In this embodiment, elongated hooking recess 53 is similar to conventional flat hooks. Elongated hooking recess 53 is adapted for coupling to structural edges as well as standard anchor points capable of holding a conventional flat hook or to other conventional flat hooks used on some tie-down straps or ropes. Adapter second end 54 includes an anchor connector opening 55. Anchor connector opening 55 is sized to receive elongated end portion 32 of anchor point connector 30 for interlocking with anchor point connector 30 and to prevent anchor point connector 30 from easily falling out of its interlocking relationship with tie-down adapter 50. A portion of an anchor point connector 30 is shown in dashed lines to illustrate one way of coupling the two components. The size of anchor connector opening 55 allows anchor point connector 30 and tie-down adapter 50 to remain coupled while tensioning the tie-down straps or ropes.

Figures 8A, 8B:
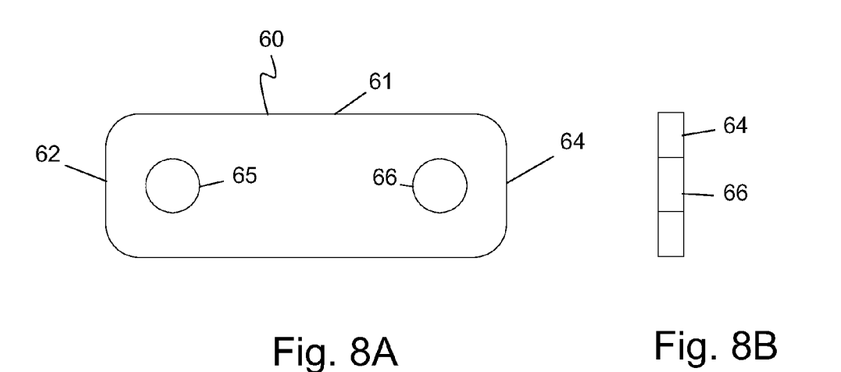
FIG. 8A is a front view of one embodiment of an interconnect adapter of the present invention for use in connecting a pair of ratchet-type mechanisms having anchor point connectors or an anchor point connector and a standard J-hook, split hook or S-hook.
FIGS. 8B and 8C are side and end views, respectively, of the illustration shown in FIG. 8A.
Figure 8C:
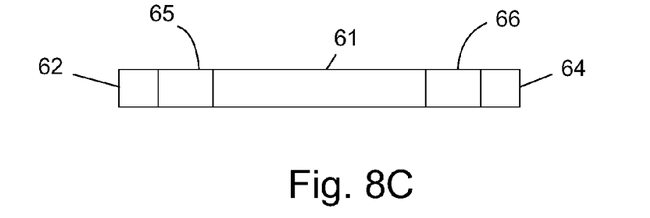

FIGS. 8A, 8B and 8C illustrate an interconnect adapter of the present invention. Interconnect adapter 60 includes an interconnect body 61, an interconnect first end 62, and an interconnect second end 64. Interconnect first end 62 and interconnnect second end 64 include anchor connector openings 65, 66, respectively. Anchor connector openings 65, 66 are sized to receive elongated end portion 32 of anchor point connector 30 for interlocking with anchor point connector 30 and to prevent anchor point connector 30 from easily falling out of its interlocking relationship with interconnect adapter 60. The size of anchor connector openings 65, 66 allows anchor point connector 30 and interconnect adapter 60 to remain coupled while tensioning the tie-down straps or ropes.

Figure 8D:
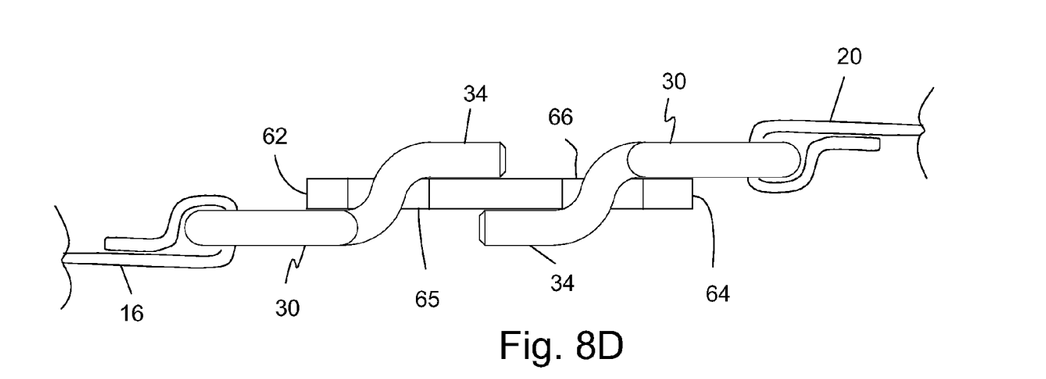
FIG. 8D is a side view showing the coupling of a pair of anchor point connectors to each other using the interconnect adapter.

FIG. 8D is a side view of an interconnect adapter 60 coupling two tie-down strap systems 10 to each other. As illustrated, the elongated end portions 34 of each anchor point connector 30 is inserted through one of the anchor connector openings 65, 66 to interlock the anchor point connectors 30 to the interconnect adapter 60. Although the illustrated size of the interconnect adapter 60 relative to the anchor point connectors 30 seems to indicate that the anchor point connectors 30 must be inserted from opposite sides of interconnect adapter 60, it should be understood that the interconnect adapter 60 may be made longer providing a greater distance between the elongated end portions 32, 34 so that anchor point connectors 30 may be inserted through the same side of interconnect adapter 60 without overlapping with each other. Interconnect adapter 60 is well suited for coupling two tie-down strap systems 10 together or for use with other bent rod adapters of the present invention, which are disclosed below.

Figures 9A, 9B, 10A, 10B, 11A, 11B:
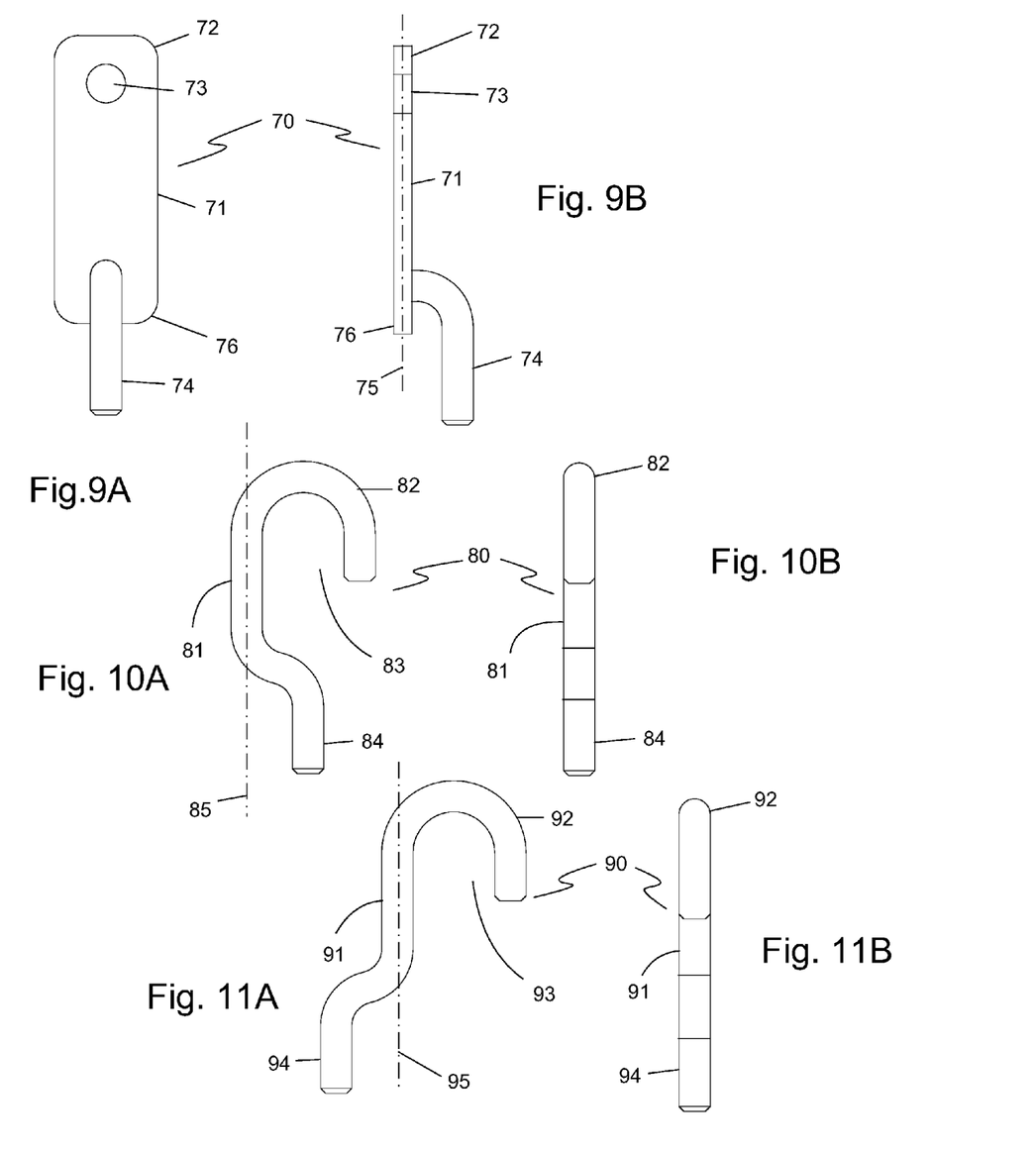
FIGS. 9A and 9B are front and side views of one embodiment of a universal adapter of the present invention.
FIGS. 10A and 10B are front and side views of one embodiment of a J-hook shaped adapter.
FIGS. 11A and 11B are front and side views of another embodiment of a J-hook shaped adapter.

FIGS. 9A and 9B illustrated one embodiment of a universal adapter of the present invention. Universal adapter 70 includes a universal body 71, a universal first end 72 and a universal second end 76. Universal first end 72 includes a universal hook opening 73. Universal hook opening 73 is sized to receive any conventional J-hook, S-hook or split hook tie-down straps or to receive elongated end portion 32 of anchor point connector 30 for interlocking with anchor point connector 30 Universal second end 76 includes an elongated end portion 74 that is fixedly attached to universal adapter 70. Elongated end portion 74 extends longitudinally away from universal body 61 for a predefined distance and is offset from the longitudinal axis plane (illustrated as line 75) of universal body 31. Elongated end portion 74 is preferably formed from a rod having a three-eighths' inch diameter (⅜"). Preferably, universal body 71 is a plate body and elongated end portion 74 is a bent rod portion that is fixedly secured to the plate body adjacent one of the ends. As previously disclosed, elongated end portion 74 is sized to be inserted in and coupled to drain openings in the cargo bed of trucks, including those drain openings in the body of a tailgate.

FIGS. 10A and 10B illustrate another embodiment of a universal adapter of the present invention. Universal hook adapter 80 includes a hook adapter body 81, a hook adapter first end 82 and a hook adapter second end 86. Hook adapter first end 82 includes a hook that extends from one end of hook adapter body 81 forming a hooking recess 83. In this embodiment, hooking recess 83 is similar to conventional J-hooks. Hooking recess 83 is adapted for coupling to a standard anchor point capable of holding a conventional J-hook or to other conventional J-hooks used on conventional tie-down straps or ropes. In the former case, an interconnect adapter 60 is typically needed. Hook adapter second end 86 includes an elongated end portion 84. Elongated end portion 84 extends longitudinally away from hook adapter body 81 for a predefined distance and is offset from hook adapter body 81 toward the longitudinal axis that bisects hook recess 83 (illustrated as line 85) of hook adapter first end 82. Universal hook adapter 80 is preferably formed from a rod having a three-eighths' inch diameter (⅜"). As previously disclosed, elongated end portion 84 is sized to be inserted in and coupled to drain openings in the cargo bed of trucks, including those drain openings in the body of a tailgate.

FIGS. 11A and 11B illustrate yet another embodiment of the universal hook adapter shown in FIGS. 10A and 10B. In this embodiment, universal hook adapter 90 includes a hook adapter body 91, a hook adapter first end 92 and a hook adapter second end 96. Hook adapter first end 92 includes a hook that extends from one end of hook adapter body 91 forming a hooking recess 93. In this embodiment like the embodiment in FIGS. 10A and 10B, hooking recess 93 is similar to conventional J-hooks. Hooking recess 93 is adapted for coupling to a standard anchor point capable of holding a conventional J-hook or to other conventional J-hooks used on conventional tie-down straps or ropes. In the former case, an interconnect adapter 60 is typically needed. Hook adapter second end 96 includes an elongated end portion 94. Elongated end portion 94 extends longitudinally away from hook adapter body 91 for a predefined distance and is offset from hook adapter body 91 away from the longitudinal axis that bisects hook recess 93 (illustrated as line 95) of hook adapter first end 92. Like its previously introduced embodiment, universal hook adapter 90 is preferably formed from a rod having a three-eighths' inch diameter (⅜"). As previously disclosed, elongated end portion 94 is sized to be inserted in and coupled to drain openings in the cargo bed of trucks, including those drain openings in the body of a tailgate.

It is further contemplated that the universal adapter 70 may be packaged as a kit that includes a pair of universal adapters 70 and instructions. The instructions describe how to install universal adapter 70 into the drain openings or bolt holes in a cargo bed and/or tailgate or other structural component for use with conventional tie-down straps and/or ropes to secure low-profile cargo to the cargo bed. Another embodiment of the kit may include one or more universal hook adapters 80, 90. In still another embodiment of a kit of the present invention, the kit may include one or more tie-down strap systems 10 with one or more J-hook and/or flat hook adapters 40, 50 or with an interconnect adapter 60 or any combination of hook adapters 40, 50 and interconnect adapter 60.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An adapter kit for use with conventional tie-down straps or ropes, the kit comprising:
    a universal hook adapter having an adapter body with an opening formed at a first body end and sized to receive one of a J-hook, a split hook or an S-hook of a conventional tie-down strap or a rope, the adapter body defining a longitudinal axis plane, and an elongated end portion connected to the adapter body opposite the first body end through a bend that positions the elongated end portion to extend from and to continue in a longitudinal direction away from the adapter body and the first body end wherein the elongated end portion is parallel to and offset from the longitudinal axis plane of the adapter body; and
    instructions for installing the elongated end portion of the universal hook adapter into an anchor point of a truck bed and connecting one of a hook of a conventional tie-down strap system or a rope to the opening in the first body end of the universal hook adapter.

2. The kit of claim 1 further comprising an offset adapter hook having a central body portion, the central body portion defining a longitudinal axis plane, a hook structure defining a hook recess connected to the first body end, and an adapter hook elongated end portion connected to the central body portion opposite the first body end through a bend that positions the adapter hook elongated end portion to extend from and to continue in a longitudinal direction away from the central body portion and the first body end wherein the adapter hook elongated end portion is parallel to and offset from the longitudinal axis plane of the central body portion, the adapter hook elongated end portion sized for interlockingly connecting with the opening formed in the first body end of the universal hook adapter or a drain or bolt aperture of a structure.

3. The kit of claim 2 wherein the adapter hook elongated end portion is offset toward the hook recess of the hook structure.

4. The kit of claim 2 wherein the adapter hook elongated end portion is offset away from the hook recess of the hook structure.

* * * * *